UNITED STATES PATENT OFFICE.

OTTO REUTER, OF SCHLEBUSCH-MANFORT, GERMANY, ASSIGNOR, BY MESNE ASSIGNMENTS, TO DYNAMIT-ACTIEN-GESELLSCHAFT, OF HAMBURG, GERMANY.

PROCESS OF PRODUCING A LIQUID EXPLOSIVE.

1,166,546.     Specification of Letters Patent.     Patented Jan. 4, 1916.

No Drawing.     Application filed July 27, 1912. Serial No. 711,859.

*To all whom it may concern:*

Be it known that I, OTTO REUTER, of Schlebusch - Manfort, in the Kingdom of Prussia, and in the Empire of Germany, have invented a certain new and useful Improvement in Processes of Producing a Liquid Explosive, and do hereby declare that the following is a full, clear, and exact description thereof.

My invention relates particularly to the production of liquid explosives containing nitrotoluenes. Explosives containing a nitrotoluene, especially trinitrotoluene, have come into comparatively wide use in recent years. In using trinitrotoluene as an explosive, the trinitrotoluene has been used in a solid form by being loaded either with the aid of fusion or compression to give it the required shape. It has been found desirable, however, to have a nitrotoluene explosive, especially one containing trinitrotoluene, which is liquid or plastic, so that it may be more readily worked and applied in the manufacture of explosive devices. An effort has been made to render explosives of this character plastic by the addition of rosin, but this has been unsuccessful, owing to the fact that the rosin reduces the strength of the explosive.

I have discovered that a liquid or plastic explosive may be made from the distillation residues obtained in the purification of trinitrotoluene by means of recrystallization from alcohol or other solvents. In obtaining these residues the nitrotoluene to be refined is dissolved in alcohol or some other suitable solvent, and is then crystallized out from the same. The solvent is then evaporated from the mother liquor thus leaving the distillation residues containing isomeric trinitrotoluene and some dinitrotoluene. A liquid or plastic explosive can be obtained by further nitrating these residues in a manner which I will point out further in detail hereinafter. The nitrated residues thus obtained are liquid at ordinary temperatures, and may be used for producing plastic explosives by combining with any other suitable solid explosives such, for example, as trinitrotoluene, nitrocellulose, etc. These nitrated residues are a mixture of nitrotoluenes, trinitrotoluene and the isomers of trinitrotoluene being among the most important constituents. The fact that residues treated in this manner are liquid, is due to the fact that the several substances found in the same tend to reduce the melting point of the mixture far below the melting points of the several constituents. The melting points of the several constituents of the nitrated residues are between 48° and 110° C. Of these the isomeric trinitrotoluenes, which are the most important constituents, have melting points which are, respectively, 81° C., 104° C., and 112° C. In addition to these, the nitrated residues contain 2.5-dinitrotoluene, which melts at 48° C. and five other isomers thereof which melt at temperatures between 60° and 92° C. Notwithstanding the fact that these several constituents have comparatively high melting points, the melting point of the mixture is very low and, in fact, is considerably below 10° C. This fact is somewhat astonishing when we consider the fact that technical dinitrotoluene, consisting of a mixture of 2.4-dinitrotoluene, melting at 70° C. and 2.5-dinitrotoluene, melting at 48° C. has a melting point which is between the melting points of its two constituents; and in view of the fact that the melting point of crude technical trinitrotoluene, which consists principally of 2.4.6-trinitrotoluene, melting at 81° C. and small quantities of the above mentioned dinitrotoluenes, has a melting point between 70 and 80° C., a melting point which is very near to that of its components.

One further great advantage of my process is that it makes possible the use of a substance which was formerly a waste product and which was, in fact, dangerous to handle. Its use in accordance with my process makes it a product of great value having many uses.

While my invention is capable of being carried out in many different ways, as illustrative of the different ways in which it may be effected, I may proceed in the following manner: I. In accordance with one way of carrying out my invention, I add 100 kg. of the rectification residues containing about 15% of nitrogen, to 185 kg. of mixed acid comprising 85% of sulfuric acid and 15% of nitric acid. The acids are monohydric sulfuric acid and nitric acid. This mixture is heated to the temperature of preferably from 85° to 100° C. By this method 87 kg. of a liquid nitrotoluene is obtained having a solidifying point of about 14° C. and containing, dependent upon the quality of the residues used, from 16.6% to 17.2% of nitrogen. The expansion obtainable in lead block by the use of the nitrated residues is 250 to 280 ccm. net. II. Another way of carrying out the process in which a somewhat lower solidifying point is obtainable is the following, in which an acid of lower concentration is used: In this manner of carrying out my process, I add 100 kg. of the rectification residues to 180 kg. of mixed acid comprising 78% of sulfuric acid, 15% of nitric acid and 7% of water. The acids used here are concentrated sulfuric acid and strong nitric acid. The nitration is effected under the same conditions as indicated in the first example. By this method I obtain 84 kg. of a liquid nitrotoluene having a solidifying point of 8° C.

The liquid nitrotoluene thus obtained may be used in any desired manner by using it in the form of a liquid, a plastic or a solid. It may be made into a plastic or solid by adding any other desired explosive or diluent materials which may be found desirable for making the particular explosive. As one example in which it may be used other than in its liquid form, it may be used for producing a gelatinous explosive by combination with collodion cotton, or it may be mixed in a similar manner with pure trinitrotoluene or the three may be mixed together in any desired proportions.

While I have described my invention above in detail, I wish it to be understood that many changes may be made therein without departing from the spirit of my invention.

I claim:

1. The process of producing an explosive which comprises nitrating toluene beyond the dinitrotoluene stage so as to produce mainly trinitrotoluene, crystallizing out solid trinitrotoluene from a solution of the nitrotoluenes in a solvent, evaporating the solvent and nitrating the residues thus obtained.

2. The process of producing an explosive which comprises nitrating toluene beyond the dinitrotoluene stage so as to produce mainly trinitrotoluene, crystallizing out solid trinitrotoluene from a solution of the nitrotoluenes in alcohol, evaporating the alcohol and nitrating the residues thus obtained.

In testimony that I claim the foregoing I have hereunto set my hand.

OTTO REUTER.

Witnesses:
 Louis Vandory,
 F. Thronberend.